(12) United States Patent
Mazard et al.

(10) Patent No.: US 7,998,905 B2
(45) Date of Patent: Aug. 16, 2011

(54) DRILLING FLUID CONTAINING CHLOROSULFONATED ALPHA-OLEFIN COPOLYMERS

(75) Inventors: Cecile Mazard, Massy (FR); Bertrand Guichard, Villecresnes (FR); Andrea Valenti, Milan (IT)

(73) Assignee: Eliokem S.A.S., Villejust (FR)

( * ) Notice: Subject to any disclaimer, the term of this patent is extended or adjusted under 35 U.S.C. 154(b) by 523 days.

(21) Appl. No.: 12/061,030

(22) Filed: Apr. 2, 2008

(65) Prior Publication Data

US 2008/0248975 A1    Oct. 9, 2008

Related U.S. Application Data

(60) Provisional application No. 60/921,601, filed on Apr. 3, 2007.

(51) Int. Cl.
*C09K 8/36* (2006.01)
*C09K 8/32* (2006.01)
*C09K 8/28* (2006.01)
*C09K 8/00* (2006.01)
*C09K 8/04* (2006.01)
*E21B 21/00* (2006.01)

(52) U.S. Cl. ........ 507/135; 507/118; 507/122; 507/134; 507/140; 507/145; 175/65

(58) Field of Classification Search .................. 507/227, 507/135, 118, 122, 134, 140, 145; 166/305.1; 175/65

See application file for complete search history.

(56) References Cited

U.S. PATENT DOCUMENTS

| | | | |
|---|---|---|---|
| 3,347,835 A * | 10/1967 | Clark | 525/344 |
| 4,425,463 A | 1/1984 | Walker et al. | 507/120 |
| 4,447,338 A | 5/1984 | Lundberg et al. | 507/122 |
| 4,525,522 A | 6/1985 | Turner et al. | 524/547 |
| 4,560,731 A * | 12/1985 | Rifi | 525/344 |
| 5,021,170 A | 6/1991 | Shumate et al. | 507/122 |

* cited by examiner

*Primary Examiner* — Timothy J. Kugel
*Assistant Examiner* — Atnaf Admasu
(74) *Attorney, Agent, or Firm* — Alvin T. Rockhill

(57) ABSTRACT

This invention is based upon the finding that certain chlorosulfonated α-olefin copolymers can be beneficially utilized in drilling fluids that are utilized in drilling subterreanean wells. For instance, it has been unexpectedly found that certain chlorosulfonated α-olefin copolymers can be beneficially used as total or partial replacements for organoclays in oil based drilling fluids. The chlorosulfonated a-olefin copolymers that are useful in the practice of this invention are typically chlorosulfonated ethylene/octene copolymers or chlorosulfonated ethylene/butene copolymers. The utilization of chlorosulfonated α-olefin copolymers in oil-based drilling fluids offers (1) long service life at high operating temperatures, (2) minimal formation damage, (3) improved filtration behavior, and (4) highly effective performance at low viscosifier levels. Additionally, the chlorosulfonated α-olefin copolymers utilized in the practice of this invention are soluble in conventional drilling fluid formulations which reduce the level of mixing required in preparation of the drilling fluid formulation. This makes the preparation of the drilling fluid easier, faster and less energy intensive. The chlorosulfonated α-olefin copolymers used in making the drilling fluids of this invention are also free flowing powders which makes them easier to handle than the sulfonated EPDM (ethylene-propylene-diene monomer rubbers) crumbs employed in the drilling fluids of the prior art. The present invention more specifically discloses an oil-based drilling fluid which is comprised of: (a) an organic liquid; (b) water; (c) an emulsifier; (d) a wetting agent; (e) a fluid loss reducing agent; (f) a weighting material; and (g) a chlorosulfonated α-olefin copolymer.

18 Claims, 3 Drawing Sheets

DRILLING FLUID CONTAINING CHLOROSULFONATED ALPHA-OLEFIN COPOLYMERS

This application claims benefit of U.S. Provisional Patent Application Ser. No. 60/921,601 filed on Apr. 3, 2007. The teachings of U.S. Provisional Patent Application Ser. No. 60/921,601 are incorporated herein by reference in their entirety.

BACKGROUND OF THE INVENTION

Drilling fluids (muds) are normally used in drilling oil and gas wells. These fluids are used to maintain pressure, cool drill bits, and lift cuttings from the holes as the well is being drilled. Drilling fluids vary greatly in composition depending upon specific requirements of the well being drilled as well as geological considerations. However, drilling fluids typically fall into the class of aqueous formulations or oil-based formulations.

Early oil-based drilling fluid formulations that are no longer used were typically comprised of the following ingredients: oil (generally No. 2 diesel fuel), emulsifying agents (alkaline soaps and fatty acids), wetting agents (dodecylbenzene sulfonate), water, barite or barium sulfate, (weighting agent), asbestos (employed as viscosification agent) and/or, amine-treated clays (also as viscosification agent). These oil-based drilling fluid formulations were generally formulated based primarily on amount of barite added. For example, such a typical drilling fluid could range in specific gravity from about 7 pounds per gallon up to 17 pounds per gallon or even greater. This variation in specific gravity is primarily controlled by the amount of barite added.

Oil-based drilling fluid formulations perform adequately in a number of applications, primarily those where the use of oil-based drilling fluids is dictated by the lack of stability of the formation in which drilling is taking place. For example, in various types of shale formation, the use of conventional water-based fluids can result in a deterioration and collapse of the shale formation. The use of the oil-based formulations circumvents this problem. However, traditional oil-based drilling fluid formulations also have some significant disadvantages. One disadvantage is that the incorporation of asbestos or asbestos fines can result in significant health problems, both during the fluid formulation and potentially during the subsequent use of such formulations. Therefore, in recent years there has been a strong push to reduce the level of asbestos used in such formulations or to eliminate the use of asbestos completely. The use of substitutes for asbestos as viscosity enhancing agents in such application has not been universally successful by virtue of the fact that the replacement must maintain adequate viscosities under the drilling conditions which can involve high temperature and high shear conditions.

As noted in U.S. Pat. No. 4,425,463, there has been a substantial need for a drilling fluid which would exhibit good performance at high temperatures in water sensitive formations. Past experience has shown that oil-based drilling fluids can provide good performance in water sensitive formations, and the state of the art systems can perform well at temperatures of up to about 350° F. (177° C.). In cases where the viscosity of conventional oil-based drilling fluids break down during drilling operations additional viscosifier is added to the drilling fluid being circulated into the well. In other words, the problem of viscosity loss during drilling is traditionally circumvented by the addition of more viscosifier to the drilling fluid being circulated into the well. While this solution is adequate at moderate temperatures the degradation of the viscosifier can be so rapid at high temperatures, such as those encountered in drilling geothermal wells and natural gas wells, that cost of utilizing the amount of additional viscosifier required can become cost prohibitive. There is accordingly a need for oil-based drilling fluids that can maintain their viscosity and gel strength at temperatures of 400° F. (204° C.) or even higher.

U.S. Pat. No. 4,525,522 describes an approach to viscosification of oil-based drilling fluids which permits the substitution of latices of sulfonated ionomers for asbestos fines and amine clays. These resulting polymer-modified drilling fluids are reported to display improved low temperature rheological properties which include improved gel strength at up to temperatures of 400° F. (204° C.) and higher, based on tests conducted for 16 hours at such temperatures.

U.S. Pat. No. 4,525,522 more specifically discloses latices of sulfonated thermoplastic polymers which function as viscosification agents when added to oil-based drilling fluids which are the fluids used to maintain pressure, cool drill bits and lift cuttings from the holes in the drilling operation for oil and gas wells. The sulfonated thermoplastic polymer of these latices contain about 5 to about 100 meq. of sulfonate groups per 100 grams of the sulfonated thermoplastic polymer, wherein the sulfonated groups are neutralized with a metallic cation or an amine or ammonium counterion. U.S. Pat. No. 4,525,522 further reports that a polar cosolvent can optionally be added to the mixture of oil drilling fluid and sulfonated polymer, wherein the polar cosolvent increases the solubility of the sulfonated polymer in the oil drilling fluid by decreasing the strong ionic interactions between the sulfonate groups of the sulfonated polymer.

U.S. Pat. No. 4,447,338 discloses that sulfonated EPDM is very effective as a viscosifier for oil-based drilling fluids. U.S. Pat. No. 4,447,338 more specifically discloses an oil base drilling fluid which comprises: (a) an organic liquid selected from the group consisting of a diesel fuel, kerosene, fuel oil and crude oil; (b) about 1 to about 10 parts by weight of water per 100 parts by weight of the organic liquid; (c) about 20 to about 50 lb/bbl of at least one emulsifier; (d) weighting material of sufficient quantity necessary to achieve the desired density; and (e) about 0.25 to abut 2 lb/bbl of a water insoluble neutralized sulfonated elastomer, said neutralized sulfonated polymer elastomer having about 5 to about 30 meg. of sulfonate groups per 100 grams of the neutralized sulfonated polymer elastomer, said neutralized sulfonated elastomer being derived from an elastomeric polymer selected from the group consisting of EPDM terpolymers and butyl rubber, said EPDM terpolymers having a number average molecular weight of about 10,000 to about 200,000 and said butyl rubber having a Staudinger molecular weight of about 20,000 to about 500,000.

U.S. Pat. No. 4,425,463 discloses the use of mixtures of sulfonated thermoplastic polymers and amine-treated clays as viscosification agents for utilization in oil-based drilling fluids. U.S. Pat. No. 4,425,463 muse specifically discloses a oil-based drilling fluid which comprises: (a) an organic liquid immiscible with water; (b) about 1 to about 10 parts by weight of water per 100 parts by weight of the organic liquid; (c) about 20 to about 50 lb/bbl. of emulsifier; (d) weighting material necessary to achieve the desired density; (e) about 0.25 to about 4.0 lb/bbl. of water insoluble neutralized sulfonated thermoplastic polymer having about 5 to about 100 meq. of sulfonate groups per 100 grams of the neutralized sulfonated thermoplastic polymer; and (f) about 1 to about 10 lb/bbl. of an amine-treated clay.

U.S. Pat. No. 5,021,170 discloses an invert emulsion drilling fluid comprising a liquid oleaginous medium, water, an emulsifier and a gellant comprised of sulfonated ethylene/propylene/5-phenyl-2-norbornene terpolymer and an organophilic clay. U.S. Pat. No. 5,021,170 more specifically reveals a oil-based drilling fluid comprising: (a) a liquid oleaginous phase; (b) a polar liquid phase, said oleaginous phase being present in an amount of from about 30 to about 98% by volume of the liquid phase, said polar liquid phase being present in an amount of from about 2 to about 70% by volume of the liquid phase; (c) an emulsifier; and (d) a gellant comprising a sulfonated ethylene/propylene/5-phenyl-2-norbornene terpolymer having a number average molecular weight of about 5,000 to about 300,000; and an organophilic clay comprising the reaction product of an organic onium compound and a smectite clay, the weight ratio of said organophilic clay to said terpolymer being from about 6:1 to about 20:1, said gellant being present in an amount sufficient to viscosify said oleaginous medium to the desired degree.

As has been noted, it is frequently important for the viscosification agents employed in drilling fluids to provide the desired level of viscosity at high service temperatures for extended periods of time. It is also critical for drilling fluids to provide the desired service characteristics, such as maintaining pressure, cooling drill bits and to lift cuttings from the hole being drilled, without causing formation damage. For instance, formation damage can be caused by organoclays used in conventional drilling fluids plugging the pores of rock formations. Good filtration behavior is another characteristic that it is desirable for drilling fluids to exhibit. A low level of the drilling fluid being lost in the rock formation is indicative of good filtration behavior. Finally, it is desirable for the viscosification agent to provide the desired increase in viscosity at a relative low concentration in the drilling fluid. There has been a long felt need in the well drilling industry for an improved drilling fluid that exhibits all of these desirable characteristics.

SUMMARY OF THE INVENTION

This invention is based upon the finding that certain chlorosulfonated α-olefin copolymers can be beneficially utilized in drilling fluids that are utilized in drilling subterreanean wells. For instance, it has been unexpectedly found that certain chlorosulfonated α-olefin copolymers can be beneficially used as total or partial replacements for organoclays in oil based drilling fluids. The utilization of chlorosulfonated α-olefin copolymers in oil-based drilling fluids offers (1) long service life at high operating temperatures, (2) minimal formation damage, (3) improved filtration behavior, and (4) highly effective performance at low viscosifier levels. Additionally, the chlorosulfonated α-olefin copolymers utilized in the practice of this invention are soluble in conventional drilling fluid formulations which reduces the level of mixing required in preparation of the drilling fluid formulation. This makes the preparation of the drilling fluid easier, faster, and less energy intensive. The chlorosulfonated α-olefin copolymers used in the practice of this invention are copolymers of ethylene and an α-olefin that contains from 4 to about 8 carbon atoms. These chlorosulfonated α-olefin copolymers typically contain from about 0.2 weight percent to about 5 weight percent sulfur and can optionally be reacted with water to yield a sulfonic acid or reacted and neutralized with a base, such as sodium hydroxide, to yield a sodium sulfonated copolymer. The chlorosulfonated α-olefin copolymers used in making the drilling fluids of this invention are also free flowing powders which makes them easier to handle than the sulfonated EPDM (ethylene-propylene-diene monomer rubbers) crumbs employed in the drilling fluids of the prior art.

The present invention more specifically discloses an oil-based drilling fluid which is comprised of: (a) an organic liquid; (b) water; (c) an emulsifier; (d) a wetting agent; (e) a fluid loss reducing agent; (f) a weighting material; and (g) a chlorosulfonated α-olefin copolymer which is comprised of repeat units that are derived from ethylene and an α-olefin that contains from 3 to about 20 carbon atoms.

The subject invention further reveals a process for drilling a well into a subterranean formation which comprises boring a hole into the earth by rotary drilling, wherein an oil-based drilling fluid is circulated down a drilling pipe and returned to the surface of the earth through a pipe hole annulus, wherein the oil-based drilling fluid is comprised of (a) an organic liquid; (b) water; (c) an emulsifier; (d) a wetting agent; (e) a fluid loss reducing agent; (f) a weighting material; and (g) a chlorosulfonated α-olefin copolymer which is comprised of repeat units that are derived from ethylene and an α-olefin that contains from 3 to about 20 carbon atoms.

The present invention also discloses a natural resource system comprising: (a) a subterranean formation; (b) a wellbore penetrating at least a portion of the subterranean formation; (c) a casing positioned within at least a portion of the wellbore; and (d) drilling fluid present in at least a portion of the area between the surface of the wellbore and the outside surface of the casing, wherein the drilling fluid is comprised of (a) an organic liquid; (b) water; (c) an emulsifier; (d) a wetting agent; (e) a fluid loss reducing agent; (f) a weighting material; and (g) a a chlorosulfonated α-olefin copolymers which is comprised of repeat units that are derived from ethylene and an α-olefin that contains from 3 to about 20 carbon atoms.

The subject invention further reveals a process for making an oil-based drilling fluid formulation which comprises mixing (a) an organic liquid; (b) water; (c) an emulsifier; (d) a wetting agent; (e) a fluid loss reducing agent; (f) a weighting material; and (g) a chlorosulfonated α-olefin copolymer which is comprised of repeat units that are derived from ethylene and an α-olefin that contains from 3 to about 20 carbon atoms, to produce the oil-based drilling fluid formulation.

DETAILED DESCRIPTION OF THE INVENTION

Figure 1:
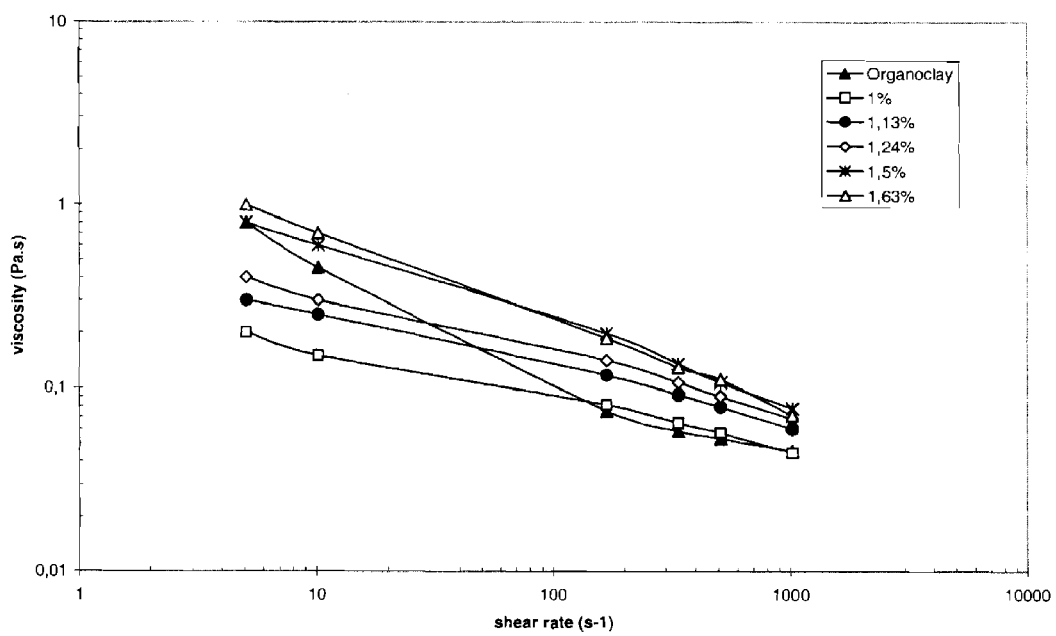
FIG. 1 is graph of viscosity as a function of shear rate for the drilling fluid formulations made in Examples 1-6.

The present invention relates to improved oil-based subterranean fluids that utilize chlorosulfonated α-olefin copolymers as their viscosification agent. These oil based fluids can be employed in drilling oil wells, gas wells, geothermal wells, and other types of wells into subterranean formations. In these oil-based fluids the organoclay, asbestos, sulfonated thermoplastic, and/or sulfonated EPDM that would typically be used in the formulation as the viscosification agent is replaced partially or totally with the chlorosulfonated α-olefin copolymer. Conventional oil-based drilling fluids formulations into which the chlorosulfonated α-olefin copolymer can be substituted as the viscosification agent are described in U.S. Pat. No. 4,425,463, U.S. Pat. No. 4,525,522, and U.S. Pat. No. 5,021,170. The teachings of U.S. Pat. No. 4,425,463, U.S. Pat. No. 4,525,522, and U.S. Pat. No. 5,021,170 are incorporated herein by reference for the purpose of describing oil-based drilling fluids into which the chlorosulfonated α-olefin copolymers of this invention can be incorporated as the viscosification agent.

The oil-based drilling fluids of the instant invention are typically comprised of an organic liquid such as an oil, fresh water or salt water, an emulsifier, a weighting material and the chlorosulfonated α-olefin copolymer. The drilling fluid formulation can also include a wide variety of other additives and also typically include a wetting agent. In general, the oil-based drilling fluid will have a specific gravity of about 7 pounds per gallon (0.839 kg/liter) to about 20 pounds per gallon (2.397 kg/liter), more preferably about 10 (1.198 kg/liter) pounds per gallon to about 16 pounds per gallon (1.917 kg/liter), and most preferably about 12 pounds per gallon (1.438 kg/liter) to about 18 pounds per gallon (1.917 kg/liter). A typical oil-based drilling fluid is comprised of an oil, about 0 to about 40 parts by weight of water per 100 parts by weight of the oil. The drilling fluid will preferably contain about 5 to about 30 parts by weight of water per 100 parts by weight of the oil. The drilling fluid will most preferably contain about 5 to about 20 parts by weight of water per 100 parts by weight of the oil. The drilling fluid will also typically contain 0 ppb (pounds per barrel) to about 20 ppb of an emulsifier and/or supplementary emulsifier and about 0 ppb to about 20 ppb of a wetting agent.

A weighting material (barium sulfate or barite) will also typically be included at the level necessary to give the desired fluid density. The weighting material will normally be included in the drilling fluid formulation at a level of less than about 800 ppb, more preferably about 5 ppb to about 750 ppb, and most preferably about 10 ppb to about 700 ppb. Some representative examples of weighting materials that can be used include barium sulfate, barite, hematite, and calcium carbonate. In many cases it is preferred to use barium sulfate or barite as the weighting material.

The chlorosulfonated α-olefin copolymer will typically be included in the drilling fluid formulation at a level which is within the range of about 0.1 ppb to about 10 ppb. The chlorosulfonated α-olefin copolymer will more typically be included in the drilling fluid formulation at a level which is within the range of about 0.5 ppb to about 6 ppb. The chlorosulfonated α-olefin copolymer will preferably be included in the drilling fluid formulation at a level which is within the range of about 1 ppb to about 4 ppb. The chlorosulfonated α-olefin copolymers will most preferably be included in the drilling fluid formulation at a level which is within the range of about 1 ppb to about 3 ppb.

The oil employed in the oil-based drilling fluids of this invention can be an aromatic oil or an aliphatic oil. Thus, the oil can have a relatively high aromatic content, such as No. 1 diesel fuel, No. 2 diesel fuel, kerosene, jet fuel, and the like. However, the α-olefin copolymers of this invention offer the advantage of being capable of being used in making drilling fluid formulations with aliphatic oils having a low aromatic content. Some representative examples of base oils that can be used include paraffin, iso olefin, α-olefin, Low Toxicity Mineral Oil (LTMO), ester, Diesel.

Some representative examples of suitable emulsifiers which can be employed in making the drilling fluids of this invention include soaps of fatty acids, such as magnesium or calcium soaps of fatty acids, fatty acid derivatives including amino-amines, polyamides, polyamines, esters (such as sorbitan monoleate polyethoxylate, sorbitan dioleate polyethoxylate), imidaxolines, and alcohols.

Typical but non-limiting examples of suitable wetting agents that can be utilized include lecithin, fatty acids, crude tall oil, oxidized crude tall oil, organic phosphate esters, modified imidazolines, modified amidoamines, alkyl aromatic sulfates, alkyl aromatic sulfonates (alkylaryl sulfonates), and organic esters of polyhydric alcohols.

Typical but non-limiting examples of weighting materials which can be employed in the drilling fluids of this invention include barite, barium sulfate which may optionally be surface-treated with other cations, such as calcium, iron oxide, gelana, siderite, and calcium carbonate.

The chlorosulfonated α-olefin copolymers used in the practice of this invention can be of three genres:

(1) A chlorosulfonated ethylene copolymer comprising 0.5 to 10 weight percent chlorine, 0.25 to 5 weight percent sulfur and a plurality of —$SO_3M$ groups, wherein M is a cation, said chlorosulfonated copolymer produced from a linear olefin copolymer comprising copolymerized units of 45 to 80 weight percent ethylene and 55 to 20 weight percent of an alpha-olefin having 3 to 20 carbon atoms, said linear olefin copolymer having a melt flow ratio, $I_{10}/I_2$, of at least 4 and a ratio of Mw/Mn less than 3.5.

(2) A chlorosulfonated ethylene copolymer comprising 0.5 to 10 weight percent chlorine, 0.25 to 5 weight percent sulfur and a plurality of —$SO_3H$ groups, said chlorosulfonated copolymer produced from a linear olefin copolymer comprising copolymerized units of 45 to 80 weight percent ethylene and 55 to 20 weight percent of an alpha-olefin having 3 to 20 carbon atoms, said linear olefin copolymer having a melt flow ratio, $I_{10}/I_2$, of at least 4 and a ratio of Mw/Mn less than 3.5.

(3) A chlorosulfonated ethylene copolymer containing between 0.5 and 10 (preferably between 0.75 and 6, most preferably between 1 and 3) weight percent chlorine and between 0.25 and 5 (preferably between 0.35 and 3, most preferable between 0.5 and 2) weight percent sulfur and a plurality of $SO_2Cl$ groups.+

These chlorosulfonated copolymers are made in a solution process by reacting a polyolefin base polymer with a chlorosulfonation agent.

The polyolefin base polymers employed in the process of this invention include various ethylene/alpha-olefin copolymers. This includes traditional Ziegler-Natta linear low density polyethylene (LLDPE) and metallocene derived ethylene alpha-olefin copolymers. The alpha-olefin may be any unbranched alpha-olefin containing between 3 and 20 carbon atoms. Octene-1, butene-1 and propylene are preferred alpha-olefins. The copolymers may be semi-crystalline or amorphous. Semi-crystalline copolymers are preferred because they are easier to handle. Optionally, more than one polyolefin base polymer may be added to the reactor so as to result in a chlorosulfonated blend of polyolefin polymers.

These chlorosulfonated copolymers are made in a solution process (meaning that the polyolefin base polymer is dissolved in a solvent) by reaction with a chlorosulfonation agent selected from the group consisting of i) $Cl_2$ and $SO_2$ and ii) sulfuryl chloride ($SO_2Cl_2$).

An azo initiator (e.g. Vazo® 52 available from DuPont) is introduced and the reactor purged with an inert gas (e.g. nitrogen) to remove oxygen. After adjusting the temperature of the solution to between 50° C. and 75° C. (preferably 55° C. to 60° C.), chlorine gas, sulfur dioxide and additional initiator is introduced to the reactor. When a desired level of chlorosulfonation has occurred, the reaction mass is degassed with nitrogen, followed by application of a vacuum. Optionally, an epoxide, e.g. Epon® 828 (available from Hexion Specialty Chemicals), is added to stabilize the product. Also optionally, an antioxidant, e.g. Irganox® 1010 (available from Ciba Specialty Chemicals) is added to protect the polymer during isolation and storage. The $SO_2Cl_2$ chlorosulfonation process differs from the $Cl_2/SO_2$ process in that sulfuryl chloride and an amine activator rather than chlorine gas and sulfur dioxide along with an azo initiator, is employed to chlorosulfonate the polyolefin base polymer.

Alternately, the chlorosulfonated copolymer solution can be utilized to prepare a partially neutralized aqueous emulsion of chlorosulfonated polymer salts [—$SO_3M$] that can be isolated directly from solution as a dry polymer.

In the practice of this invention the drilling fluid will be prepared by mixing the various ingredients thereof either at the drilling site or at a remote location for delivery to the drilling site. In either case, as the well is being drilled the drilling fluid will be continuously circulated down the drill pipe to the vicinity of the drilling bit and returned to the surface in the annulus. Bit cuttings generated by the rotating drill bit are carried to the surface in the drilling fluid where the fluid is processed through a shale shaker and solids separation apparatus.

The specific techniques used when employing the drilling fluid of this invention will be determined by its intended use and is analogous to methodologies employed when using prior art drilling fluids for corresponding completion or workover operations. For example, when the drilling fluid is employed as a gravel packing fluid, it is typically injected into the formation in accordance with the procedure described in U.S. Pat. No. 4,552,215. The teachings of U.S. Pat. No. 4,552,215 are incorporated herein by reference for the purpose of teaching this drilling technique.

When employed as a fracturing fluid, the drilling fluid of this invention is usually injected into the formation using procedures analogous to those disclosed in U.S. Pat. No. 4,488,975, U.S. Pat. No. 4,553,601, Howard et al., Hydraulic Fracturing, Society of Petroleum Engineers of the American Institute of Mining, Metallurgical, and Petroleum Engineers, Inc., New York, N.Y. (1970), and Allen et al., Production Operations, Well completions, Workover, and Stimulation, 3rd Edition, volume 2, Oil & Gas Consultants International, Inc., Tulsa, Okla. (1989) (Allen), chapter 8, these publications being incorporated herein by reference in their entirety.

When employed in a perforating operation, the drilling fluids of the present invention are normally used according to the methodologies disclosed in chapter 7 of Allen, referenced above. Techniques for using packer fluids and well killing fluids, such as those discussed in chapter 8 of Allen, are also applicable to the drilling fluids of the present invention.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES 1-6

In this series of experiments oil-based drilling fluid formulations were made utilizing chlorosulfonated α-olefin copolymers having varying levels of sulfonation as the viscosification agent. These oil-based drilling fluids were compared to an identical oil-based drilling fluid formulation that was made utilizing an organoclay as the viscosification agent. All of the drilling fluids made in this series of experiments had a density of 15 ppg and an oil to water ratio (OWR) of 80:20.

The constituents employed in making these drilling fluids are identified in Table 1. The conventional oil-based drilling made with the organoclay is identified as Fluid A. The drilling fluids made with the chlorosulfonated α-olefin copolymers are identified as being Fluid B. It should be noted that the drilling fluid made with the organoclay contained 4 ppb of the organoclay. However, the drilling fluids made with the chlorosulfonated α-olefin copolymers contained only 1 ppb of the sulfonated copolymer. The chlorosulfonated α-olefin copolymers utilized in Fluid B compositions (Examples 2-6) all had the same molecular weight but contained differing levels of sulfonation (1%, 1.13%, 1.24%, 1.5%, and 1.63% sulfonation).

TABLE 1

| Component | Fluid A | Fluid B |
|---|---|---|
| Oil | 153.5 ppb | |
| Primary emulsifier | 6 ppb | |
| Secondary emulsifier | 4 ppb | |
| Organoclay | 4 ppb | — |
| Viscosifier | — | 1 ppb |
| Fluid Loss Reducer | 4 ppb | |
| Lime | 6 ppb | |
| Brine (26%) | 47 ppb | |
| Weighting agent | 394.3 ppb | |

All of the drilling fluids evaluated in this series of experiments were aged by hot-rolling for 16 hours at a temperature of 250° F. (121° C.) before being characterized. In drilling, once the critical value or yield point (YP) of the drilling fluid is achieved, the rate of flow or rate of shear typically increases with an increase in pressure, causing flow or shearing stress. The high shear viscosity, known as plastic viscosity (PV), is similarly measured in centipoise units. In drilling fluids, yield points (YP) above a minimum value are desirable to adequately suspend solids, such as weighting agents and cuttings. A drilling fluid system preferably has a yield point of from about 10 to about 50, preferably 15 to 30 pounds per 100 square feet.

The rheological stability of a drilling fluid is monitored by measuring its yield point and gel strengths, in accordance with standard drilling fluid tests, before and after circulation down the wellbore. These standard tests, which include the tests for yield point (YP) and plastic viscosity (PV), are well known in the industry and are described in "Recommended Practice Standard Procedure for Field Testing Water-Based Drilling Fluids," Recommended Practice 13B-1 (1st ed. Jun. 1, 1990), American Petroleum Institute (hereinafter referred to as "RP 13B-1").

The plastic viscosity, yield point, and filtration volume (V) measured by static filtration at 300° F. (149° C.) of the drilling fluids made in this series of experiments is reported in Table 2. The viscosity characteristics of the drilling fluids made in this series of experiments is shown in FIG. 1. As can be seen increasing levels of sulfonation increased the viscosity of the fluid as well as the shear thinning amplitude. This experiment also shows that the chlorosulfonated α-olefin copolymers could be used to attain similar viscosity characteristics to those attained using organoclays. However, the level of the sulfonated copolymer needed to achieve this objective was only about 25% of the amount of organoclay needed to attain similar viscosity characteristics.

As can be seen from Table 2, the yield point of the drilling fluids of this invention made with the chlorosulfonated α-olefin copolymers were higher than those of the conventional drilling fluid made with the organoclay. This increase in yield point was observed at every level of sulfonation evaluated. The plastic viscosities of the drilling fluids of this invention at copolymer sulfonation levels between about 1.2% and 1.5% were also higher than that observed in the case of the control made using the organoclay. Accordingly, this series of experiments shows that chlorosulfonated α-olefin copolymers can be utilized in making drilling fluids having superior characteristics. Additionally, such drilling fluids can be made utilized a relatively low level of the sulfonated copolymer.

TABLE 2

PV, YP, and filtration volume values

| Viscosifier | Organoclay | 1% | 1.13% | 1.24% | 1.5% | 1.63% |
|---|---|---|---|---|---|---|
| PV | 42 | 32 | 41 | 46 | 48 | 31 |
| YP | 14 | 25 | 38 | 44 | 59 | 80 |
| V (ml) | 5.8 | 4.8 | 7.4 | 7.2 | 9.6 | 9 |

EXAMPLES 7-11

In this series of experiments oil-based drilling fluid formulations were made utilizing varying levels of chlorosulfonated α-olefin copolymers. These oil-based drilling fluids were compared to an identical oil-based drilling fluid formulation that was made utilizing an organoclay as the viscosification agent. All of the drilling fluids made in this series of experiments had a density of 18 ppg and an oil to water ratio (OWR) of 85:15.

The constituents employed in making these drilling fluids are identified in Table 3. The conventional oil-based drilling made with the organoclay is identified as Fluid C. The drilling fluids made with the chlorosulfonated α-olefin copolymers are identified as being Fluid D. It should be noted that the drilling fluid made with the organoclay contained 2.45 ppb of the organoclay. However, the drilling fluids made with the chlorosulfonated α-olefin copolymers contained 0.5 ppb, 1 ppb, 1.5 ppb, and 2 ppb of the sulfonated copolymer. The chlorosulfonated α-olefin copolymers utilized in Fluid D compositions (Examples 8-11) were identical (had the same molecular weight and the same level of sulfonation).

TABLE 3

| Component | Fluid C | Fluid D |
|---|---|---|
| Oil | 160 ppb | |
| Primary emulsifier | 10.5 ppb | |
| Secondary emulsifier | 7 ppb | |
| Organoclay | 2.45 ppb | — |
| Viscosifier | — | 0.5 or 1 or 1.5 or 2 ppb |
| Fluid Loss Reducer | 4.2 ppb | |
| Lime | 0.7 ppb | |
| Brine (26%) | 31 ppb | |
| Weighting agent | 557.3 ppb | |

Figure 2:
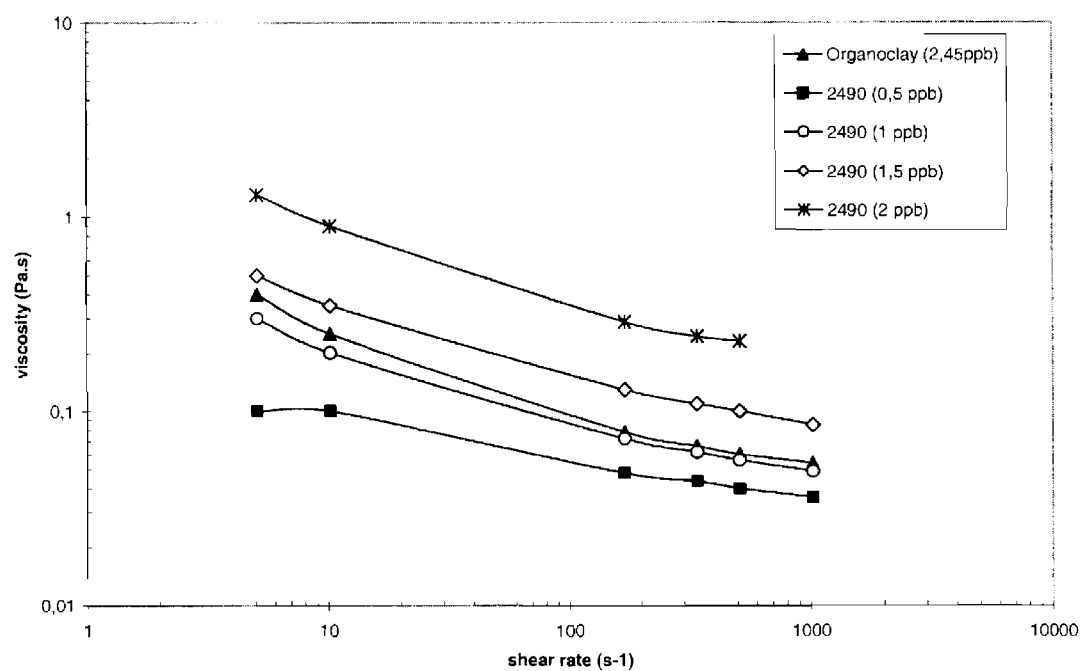
FIG. 2 is graph of viscosity as a function of shear rate for the drilling fluid formulations made in Examples 7-11.

All of the drilling fluids evaluated in this series of experiments were aged by hot-rolling for 16 hours at a temperature of 400° F. (204° C.) before being characterized. The plastic viscosity, yield point, and filtration volume (V) measured by static filtration at 350° F. (177° C.) of the drilling fluids made in this series of experiments is reported in Table 4. The viscosity characteristics the drilling fluids made in this series of experiments is shown in FIG. 2. As can be seen increasing levels of the sulfonated copolymer increased the viscosity of the fluid without changing the shear thinning amplitude. This experiment also shows that the chlorosulfonated α-olefin copolymers could be used to attain similar viscosity characteristics to those attained using organoclays. However, the level of the sulfonated copolymer needed to achieve this objective was substantially lower than the amount of organoclay needed to attain similar viscosity characteristics. This experiment also shows that a desired viscosity for the drilling fluid can be realized by adjusting the level of the sulfonated copolymer employed as the viscosifier.

As can be seen from Table 4, the yield point and plastic viscosity of the drilling fluids of this invention were higher than those of the conventional drilling fluid made with the organoclay at sulfonated copolymer loadings of 1.5 ppb. Accordingly, this series of experiments shows that chlorosulfonated α-olefin copolymers can be utilized in making drilling fluids having excellent characteristics. Additionally, such drilling fluids can be made utilized a relatively low level of the sulfonated copolymer.

TABLE 4

PV, YP, and filtration volume values

| Viscosifier | Organoclay | 0.5 ppb | 1 ppb | 1.5 ppb | 2 ppb |
|---|---|---|---|---|---|
| PV | 48 | 32 | 42 | 70 | n.d |
| YP | 12 | 8 | 14 | 30 | n.d. |
| V (ml) | 12 | 9.2 | 8 | 4 | n.d. |

It should be noted that at the 2 ppb loading level PV, YP, and V values were not determined because the fluid viscosity was too thick and therefore some of the Fann readings were out of range.

EXAMPLES 12-16

In this series of experiments oil-based drilling fluid formulations were made utilizing a combination of a chlorosulfonated α-olefin copolymer and an organoclay as the viscosification agent (see Fluid F, Fluid G, and Fluid H). For comparative purposes a drilling fluid was also made utilizing only an organoclay as the viscosification agent (Fluid E). Also, for further comparative purposes an additional fluid was made that employed only a chlorosulfonated α-olefin copolymer as the viscosification agent (Fluid I). All of the drilling fluids made in this series of experiments had a density of 18 ppg and an oil to water ratio (OWR) of 85:15.

The composition of the fluids made in this series of experiments is depicted in Table 5.

TABLE 5

| Component | Fluid E | Fluid F | Fluid G | Fluid H | Fluid I |
|---|---|---|---|---|---|
| Oil | | | 160 ppb | | |
| Primary emulsifier | | | 10.5 ppb | | |
| Secondary emulsifier | | | 7 ppb | | |
| Organoclay | 2 ppb | 1.5 ppb | 1 ppb | 0.5 ppb | — |
| Viscosifier | — | 0.5 ppb | 1 ppb | 1.5 ppb | 2 ppb |
| Fluid Loss Reducer | | | 4.2 ppb | | |
| Lime | | | 0.7 ppb | | |
| Brine (26%) | | | 31 ppb | | |
| Weighting agent | | | 557.3 ppb | | |

Figure 3:
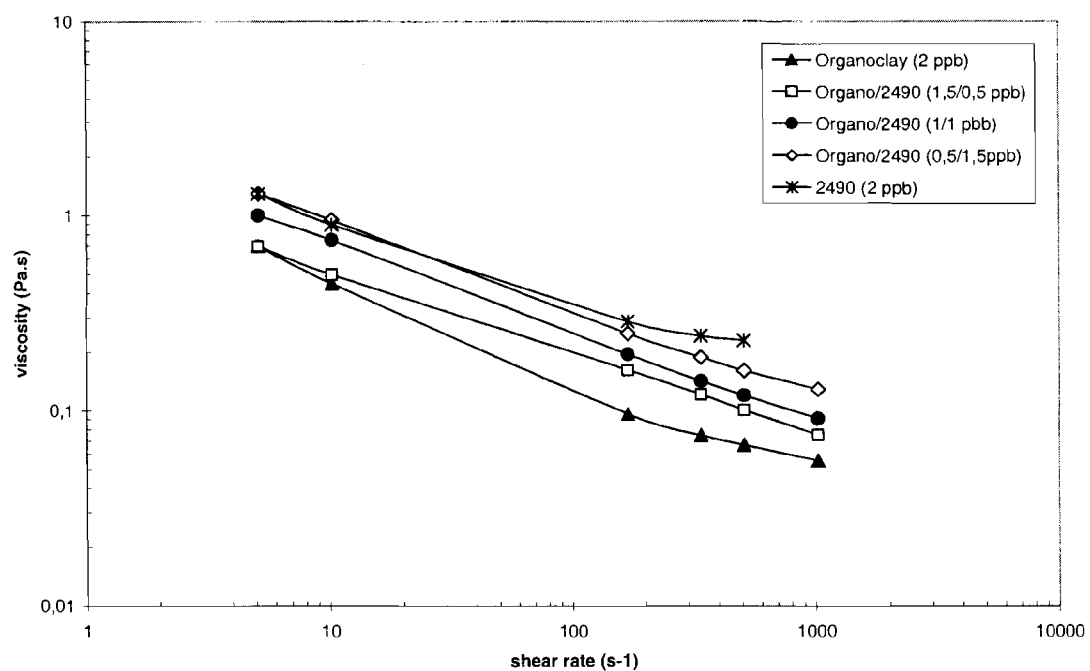
FIG. 3 is graph of viscosity as a function of shear rate for the drilling fluid formulations made in Examples 12-16.

The viscosity characteristics of the fluids made is shown in FIG. 3. The plastic viscosity, yield point, and filtration volume determined for each of these drilling fluid formulations is reported in Table 6.

TABLE 6

PV, YP, and filtration volume values

| | Viscosifier/Organoclay (ppb) | | | | |
|---|---|---|---|---|---|
| | 0/2 | 0.5/1.5 | 1/1 | 1.5/0.5 | 2/0 |
| PV | 44 | 49 | 62 | 96 | n.d |
| YP | 23 | 52 | 58 | 65 | n.d. |
| V (ml) | 12 | 8.4 | 6.2 | 4 | n.d. |

It should be noted that at the 2 ppb loading level of the sulfonated copolymer the PV, YP, and V values were not determined because the fluid viscosity was too thick and therefore some of the Fann readings were out of range.

This experiment shows that it is possible to utilize a combination of a conventional organoclay and a chlorosulfonated α-olefin copolymer as the viscosification agent.

While certain representative embodiments and details have been shown for the purpose of illustrating the subject invention, it will be apparent to those skilled in this art that various changes and modifications can be made therein without departing from the scope of the subject invention.

What is claimed is:

1. A drilling fluid which is comprised of: (a) an organic liquid; (b) water; (c) an emulsifier; (d) a weighting material; and (e) a chlorosulfonated α-olefin copolymer which is comprised of repeat units that are derived from ethylene and an α-olefin that contains from 4 to about 8 carbon atoms.

2. A drilling fluid as specified in claim 1 wherein the water is present at a level which is within the range of about 0 parts per weight to about 40 parts by weight per 100 parts by weight of the organic liquid.

3. A drilling fluid as specified in claim 1 wherein the drilling fluid has a specific gravity which is within the range of about 7 pounds per gallon to about 20 pounds per gallon.

4. A drilling fluid as specified in claim 3 wherein the chlorosulfonated α-olefin copolymer is comprised of about 45 weight percent to about 80 weight percent ethylene and about 20 weight percent to about 55 weight percent of the α-olefin containing from 4 to about 8 carbon atoms, wherein the chlorosulfonated α-olefin copolymer contains about 0.5 weight percent to about 10 weight percent chlorine, wherein the chlorosulfonated α-olefin copolymer contains about 0.25 weight percent to about 5 weight percent sulfur, wherein the chlorosulfonated α-olefin copolymer contains a plurality of —SO$_3$M groups, and wherein M represents a cation.

5. A drilling fluid as specified in claim 1 wherein the organic liquid is substantially immiscible in water.

6. A drilling fluid as specified in claim 1 wherein the organic liquid has a low aromatic content.

7. A drilling fluid as specified in claim 1 wherein the organic liquid is selected from the group consisting of paraffins, iso-olefins, α-olefins, low toxicity mineral oils, esters, and diesel fuel.

8. A drilling fluid as specified in claim 1 wherein the emulsifier is present at a level which is within the range of about 0 ppb to about 20 ppb.

9. A drilling fluid as specified in claim 1 wherein the chlorosulfonated α-olefin copolymer is present at a level which is within the range of about 0.1 ppb to about 10 ppb.

10. A drilling fluid as specified in claim 9 wherein the chlorosulfonated α-olefin copolymer contains about 0.75 weight percent to about 6 weight percent chlorine, and wherein the chlorosulfonated α-olefin copolymer contains about 0.35 weight percent to about 3 weight percent sulfur.

11. A drilling fluid as specified in claim 1 wherein the chlorosulfonated α-olefin copolymer is present at a level which is within the range of about 0.5 ppb to about 6 ppb.

12. A drilling fluid as specified in claim 11 wherein the chlorosulfonated α-olefin copolymer contains about 1 weight percent to about 3 weight percent chlorine, and wherein the chlorosulfonated α-olefin copolymer contains about 0.5 weight percent to about 2 weight percent sulfur.

13. A drilling fluid as specified in claim 1 wherein the chlorosulfonated α-olefin copolymer is comprised of about 45 weight percent to about 80 weight percent ethylene and about 20 weight percent to about 55 weight percent of an α-olefin containing from 3 to about 20 carbon atoms, wherein the chlorosulfonated α-olefin copolymer contains about 0.5 weight percent to about 10 weight percent chlorine, wherein the chlorosulfonated α-olefin copolymer contains about 0.25 weight percent to about 5 weight percent sulfur, wherein the chlorosulfonated α-olefin copolymer contains a plurality of —SO$_3$M groups, and wherein M is a cation.

14. A drilling fluid as specified in claim 13 wherein the chlorosulfonated α-olefin copolymer has a melt flow index of at least 4 and wherein the chlorosulfonated α-olefin copolymer has a ratio of weight average molecular weight to number average molecular weight of less than 3.5.

15. A drilling fluid as specified in claim 1 wherein the chlorosulfonated α-olefin copolymer is comprised of about 45 weight percent to about 80 weight percent ethylene and about 20 weight percent to about 55 weight percent of an α-olefin containing from 3 to about 20 carbon atoms, wherein the chlorosulfonated α-olefin copolymer contains about 0.5 weight percent to about 10 weight percent chlorine, wherein the chlorosulfonated α-olefin copolymer contains about 0.25 weight percent to about 5 weight percent sulfur, and wherein the chlorosulfonated α-olefin copolymer contains a plurality of —SO$_3$H groups.

16. A drilling fluid as specified in claim 15 wherein the chlorosulfonated α-olefin copolymer has a melt flow index of at least 4 and wherein the chlorosulfonated α-olefin copolymer has a ratio of weight average molecular weight to number average molecular weight of less than 3.5.

17. A drilling fluid as specified in claim 1 wherein said weighting material is selected from the group consisting of barite, barium sulfate, hematite and calcium carbonate.

18. A process for making an oil-based drilling fluid formulation which comprises mixing (a) an organic liquid; (b) water; (c) an emulsifier; (d) a wetting agent; (e) a fluid loss reducing agent; (f) a weighting material; and (g) a chlorosulfonated α-olefin copolymer which is comprised of repeat units that are derived from ethylene and an α-olefin that contains from 4 to about 8 carbon atoms, to produce the oil-based drilling fluid formulation.

* * * * *